United States Patent
Amano et al.

(10) Patent No.: US 12,420,813 B2
(45) Date of Patent: Sep. 23, 2025

(54) ELECTRONIC CONTROL UNIT

(71) Applicant: DENSO CORPORATION, Kariya (JP)

(72) Inventors: Masanobu Amano, Kariya (JP);
Motoharu Naito, Kariya (JP)

(73) Assignee: DENSO CORPORATION, Kariya (JP)

( * ) Notice: Subject to any disclaimer, the term of this patent is extended or adjusted under 35 U.S.C. 154(b) by 226 days.

(21) Appl. No.: 18/450,304

(22) Filed: Aug. 15, 2023

(65) Prior Publication Data
US 2023/0391349 A1    Dec. 7, 2023

Related U.S. Application Data

(63) Continuation of application No. PCT/JP2021/048016, filed on Dec. 23, 2021.

(30) Foreign Application Priority Data

Feb. 17, 2021 (JP) ................. 2021-023684

(51) Int. Cl.
*B60W 50/023* (2012.01)
*B60R 16/023* (2006.01)
*B60W 60/00* (2020.01)
*G06F 1/26* (2006.01)

(52) U.S. Cl.
CPC ....... *B60W 50/023* (2013.01); *B60R 16/0231* (2013.01); *B60W 60/00* (2020.02); *G06F 1/26* (2013.01)

(58) Field of Classification Search
CPC . B60W 50/023; B60W 60/00; B60R 16/0231; G06F 1/26
See application file for complete search history.

(56) References Cited

U.S. PATENT DOCUMENTS

| | | | | |
|---|---|---|---|---|
| 9,960,810 | B1* | 5/2018 | He .......................... | H04B 3/548 |
| 11,088,532 | B2* | 8/2021 | Nakamura ........... | H02H 11/001 |
| 11,820,442 | B2* | 11/2023 | Won ...................... | B62D 5/046 |
| 12,158,487 | B2* | 12/2024 | Wu ................... | H02J 13/00002 |

(Continued)

FOREIGN PATENT DOCUMENTS

| | | | | |
|---|---|---|---|---|
| EP | 2905662 A1 * | 8/2015 | ............. | G06F 1/263 |
| JP | 5924510 B2 | 5/2016 | | |
| JP | 2017-175731 A | 9/2017 | | |

*Primary Examiner* — Henry Tsai
*Assistant Examiner* — Christopher A Daley
(74) *Attorney, Agent, or Firm* — Maschoff Brennan (57) ABSTRACT

An electronic control unit includes: a first processing unit that is configured to execute predetermined arithmetic processing and generate a first control signal for controlling the vehicle; a second processing unit that is redundantly disposed with the first processing unit and is configured to generate a second control signal for controlling the vehicle; a first power supply circuit that is configured to generate power for operating the first processing unit based on power supplied from a first power supply device mounted in the vehicle; a second power supply circuit that is configured to generate power for operating the second processing unit based on power supplied from a second power supply device mounted in the vehicle; and a communication line that communicably connects the first processing unit and the second processing unit to each other. The communication line includes a pair of physical layer devices and a capacitor.

6 Claims, 6 Drawing Sheets

(56) References Cited

U.S. PATENT DOCUMENTS

| | | | |
|---|---|---|---|
| 2003/0112647 A1* | 6/2003 | Liu | H02M 3/158 |
| | | | 363/144 |
| 2007/0047663 A1* | 3/2007 | Murdock | H04L 25/0272 |
| | | | 375/257 |
| 2017/0008579 A1* | 1/2017 | Wiley | B62D 61/12 |
| 2022/0115166 A1* | 4/2022 | Bois | H01P 5/02 |
| 2024/0149911 A1* | 5/2024 | Horton | B60W 60/001 |

* cited by examiner

ELECTRONIC CONTROL UNIT

CROSS REFERENCE TO RELATED APPLICATIONS

This application is a continuation application of International Patent Application No. PCT/JP2021/048016 filed on Dec. 23, 2021, which designated the U.S. and claims the benefit of priority from Japanese Patent Application No. 2021-023684 filed on Feb. 17, 2021. The entire disclosure of all of the above application is incorporated herein by reference.

TECHNICAL FIELD

The present disclosure relates to an electronic control unit.

BACKGROUND ART

There has been known a redundant processing system having redundant CPUs.

SUMMARY

One aspect of the present disclosure is an electronic control unit mounted in a vehicle. The electronic control unit includes: a first processing unit that is configured to execute predetermined arithmetic processing and generate a first control signal for controlling the vehicle; a second processing unit that is redundantly disposed with the first processing unit and is configured to generate a second control signal for controlling the vehicle; a first power supply circuit that is configured to generate power for operating the first processing unit based on power supplied from a first power supply device mounted in the vehicle; a second power supply circuit that is configured to generate power for operating the second processing unit based on power supplied from a second power supply device mounted in the vehicle; and a communication line that communicably connects the first processing unit and the second processing unit to each other. The communication line includes (i) a pair of physical layer devices that are configured to convert an electrical signal and (ii) a capacitor that is disposed between the pair of physical layer devices on the communication line and is configured to electrically isolate the first processing unit and the second processing unit from each other by AC coupling. The pair of physical layer devices are configured to convert the electrical signal to perform communication using the AC coupling.

DESCRIPTION OF EMBODIMENTS

To begin with, a relevant technology will be described only for understanding the following embodiments.

A typical redundant processing system as described in, e.g., JP 5924510 B which is incorporated herein by reference, includes a first voltage abnormality detection circuit that detects an abnormality in power supply voltage supplied to a first CPU and a second voltage abnormality detection circuit that detects an abnormality in power supply voltage supplied to a second CPU. For example, when the power supply voltage supplied to the first CPU exceeds a predetermined threshold, the first voltage abnormality detection circuit transmits a voltage abnormality detection signal to the second CPU. The second CPU, upon receiving the voltage abnormality detection signal, outputs a cutoff signal to cut off a first switch between the first CPU and the first power supply circuit. Similarly, when the power supply voltage supplied to the second CPU exceeds a predetermined threshold, the second voltage abnormality detection circuit transmits a voltage abnormality detection signal to the first CPU. The first CPU, upon receiving the voltage abnormality detection signal, outputs a cutoff signal to cut off a second switch between the second CPU and the second power supply circuit.

However, the first CPU and the second CPU are communicably connected to each other. Therefore, for example, if the power supply voltage supplied to the first CPU is overvoltage, this overvoltage propagates from the first CPU to the second CPU via the communication line. Therefore, the second CPU would fail in addition to the first CPU before the second CPU receives the voltage abnormality detection signal and turns off the first switch. Thus, in a configuration in which a plurality of processing units are communicably connected to each other, there is a risk that the plurality of processing units will fail altogether.

One of objectives of the present disclosure is to provide an electronic control unit capable of avoiding consecutive failures of a plurality of processing units.

One aspect of the present disclosure is an electronic control unit mounted in a vehicle. The electronic control unit includes: a first processing unit that is configured to execute predetermined arithmetic processing and generate a first control signal for controlling the vehicle; a second processing unit that is redundantly disposed with the first processing unit and is configured to generate a second control signal for controlling the vehicle; a first power supply circuit that is configured to generate power for operating the first processing unit based on power supplied from a first power supply device mounted in the vehicle; a second power supply circuit that is configured to generate power for operating the second processing unit based on power supplied from a second power supply device mounted in the vehicle; and a communication line that communicably connects the first processing unit and the second processing unit to each other. The communication line includes (i) a pair of physical layer devices that are configured to convert an electrical signal and (ii) a capacitor that is disposed between the pair of physical layer devices on the communication line and is configured to electrically isolate the first processing unit and the second processing unit from each other by AC coupling. The pair of physical layer devices are configured to convert the electrical signal to perform communication using the AC coupling.

According to the above-described aspect, a pair of physical layer devices and a capacitor are provided in the communication line between the first processing unit and the second processing unit. Therefore, the first processing unit and the second processing unit can be electrically separated by AC-coupling even though the communication line is used. As a result, while enabling communication via the communication line, occurrence of consecutive failures of the plurality of processing units and via the communication line can be avoided.

Hereinafter, multiple embodiments will be described with reference to the drawings. The same or corresponding elements in the embodiments are assigned the same reference numerals or reference numerals with different hundreds place, and descriptions thereof will not be repeatedly made. When only a part of the configuration is described in each embodiment, the configuration of the other previously described embodiments can be applied to the other parts of the configuration. Further, not only the combinations of the configurations explicitly shown in the description of the respective embodiments, but also the configurations of multiple embodiments can be partially combined even when they are not explicitly shown as long as there is no difficulty in the combination in particular.

First Embodiment

First, a schematic configuration of a vehicle equipped with an automated-driving ECU according to the present embodiment will be described based on FIG. 1.

<Vehicle>

Figure 1:
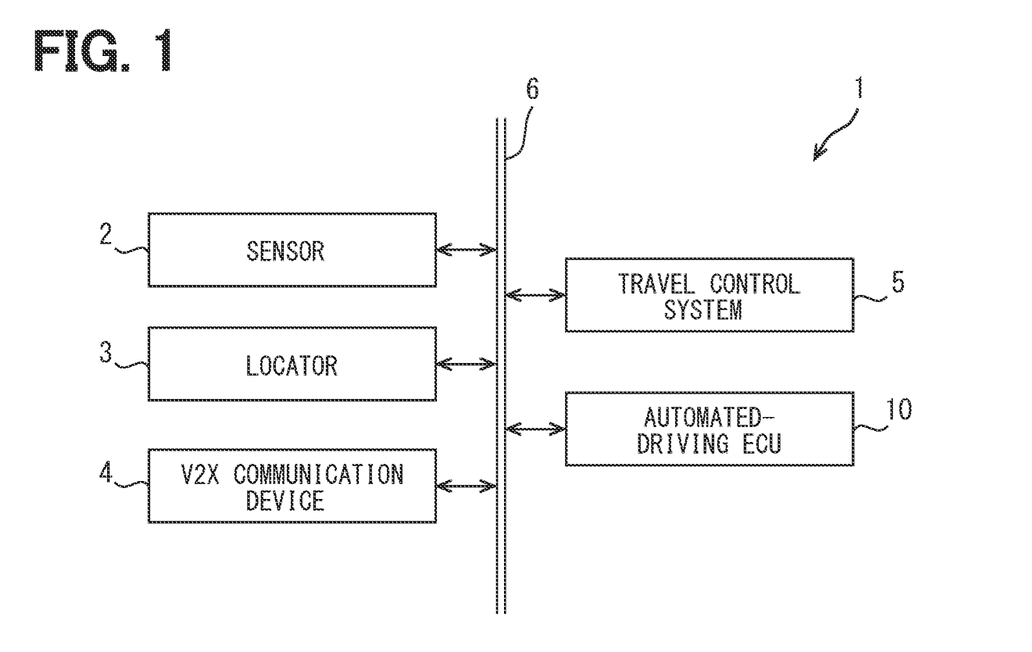
FIG. 1 is a diagram showing a vehicle equipped with an automated-driving ECU.

FIG. 1 shows an example of a vehicle 1 in which an automated-driving ECU is installed. Under a condition that the vehicle travels on a road, the vehicle 1 may be any type of vehicles without particular limitations. The vehicle may be a passenger car, a truck, or a bus. The vehicle 1 may be referred to as a "subject vehicle".

The vehicle 1 includes a sensor 2, a locator 3, a V2X communication device 4, a travel control system 5, and the automated-driving ECU 10. Each of the sensor 2, the locator 3, the V2X communication device 4, the travel control system 5, and the automated-driving ECU 10 is communicably connected to a communication bus 6 of an in-vehicle network. Each of the sensor 2, the locator 3, the V2X communication device 4, the travel control system 5, and the automated-driving ECU 10 is a node of the in-vehicle network connected to the communication bus 6. The nodes are capable of communicating with each other. The communication bus 6 includes, for example, a plurality of communication buses in compliance with mutually different communication protocols. In FIG. 1, the communication bus 6 is simplified to be illustrated as a single bus for easy understanding.

The sensor 2 is an autonomous sensor that monitors the surrounding environment of the vehicle 1. The sensor 2 can detect predetermined moving and stationary objects within a detection range around the vehicle. The sensor 2 is capable of detecting at least a preceding vehicle, a following vehicle, front and rear side vehicles, and the like, around the vehicle 1. The sensor 2 provides detection information of objects around the vehicle to the automated-driving ECU 10 and the like through the communication bus 6.

The sensor 2 includes, for example, at least one of a camera, millimeter wave radar, and LiDAR. The camera may be a monocular camera or a compound eye camera. The camera outputs at least one of imaging data obtained by capturing surroundings of the subject vehicle and an analysis result of the imaging data as detection information. The millimeter wave radar radiates millimeter waves or quasi-millimeter waves toward the surroundings of the vehicle. The millimeter wave radar outputs detection information generated by processing reflected waves reflected by a moving object, a stationary object, or the like. The LiDAR is a ranging device that emits laser light to generate, for example, three-dimensional points data indicating positions of reflection points in each detection direction. The LIDAR stands for Light Detection and Ranging/Laser Imaging Detection and Ranging.

The locator 3 is configured to include a GNSS receiver and the like. GNSS stands for Global Navigation Satellite System. The locator 3 combines a positioning signal received by the GNSS receiver and vehicle speed information output via the communication bus 6 and sequentially locates positions and traveling directions of the vehicle 1. The locator 3 sequentially outputs the location information and the direction information about the vehicle 1 based on the positioning result via the communication bus 6 as locator information.

The locator 3 further includes a map database. The locator 3 reads map data of an area around the current position from the map database, and provides the automated-driving ECU 10 and the like with the map data along with the locator information. Instead of the locator 3, a user terminal device such as a smartphone or a navigation device may provide the position information, the direction information, the map data, and the like to the automated-driving ECU 10.

The V2X communication device 4 is a communication unit mounted in the vehicle 1. V2X is an abbreviation for Vehicle to X (=Everything). The V2X communication device 4 transmits/receives information by wireless communication to/from at least one of an in-vehicle communication device mounted in another vehicle, a roadside device installed on the side of the road, and a base station (i.e., a center). The V2X communication device 4 can receive, for example, position information and speed information of other vehicles around the subject vehicle through vehicle-to-vehicle communication, road-to-vehicle communication, or wide-area wireless communication. The V2X communication device 4 may receive information indicating the control status of the automatic driving of other vehicles. For example, such information may include information whether the automatic driving functions of other vehicles around the vehicle 1 are in operation. The V2X communication device 4 provides the received information about other surrounding vehicles to the automated-driving ECU 10 and the like.

The travel control system 5 is an electronic control device that controls driving of the subject vehicle. The travel control system 5 performs steering and/or acceleration/deceleration control as travel control. The travel control system 5 includes, for example, a steering ECU that performs steering control and at least one of a power unit control ECU and a brake ECU that perform acceleration/deceleration control. The travel control system 5 outputs a control signal to the travel control device based on an operation command generated by driver's operation or a control command from the automated-driving ECU 10, thereby controlling at least one of the steering control, the braking force, and the output of the driving power source.

At least one of the above-described travel control devices is redundantly provided in the vehicle 1. Redundancy may be referred to as multiplex. The travel control device is, for example, an actuator such as an EPS motor and a brake motor. EPS is an abbreviation for Electric Power Steering.

The automated-driving ECU 10 is an electronic control unit that realizes an automated-driving function capable of performing at least part of driving operation on behalf of the driver. "ECU" is an abbreviation of "Electronic Control Unit". The automated-driving ECU 10 corresponds to an electronic control unit having a first processing unit, a second processing unit, and a communication line. The automated-driving ECU 10 executes control corresponding to an automatic driving level equal to or more than level 1 defined by the Society of Automotive Engineers of America. For example, level 1 is a level that supports either steering or acceleration/deceleration. Level 2 is a level that supports both steering and acceleration/deceleration. When executing driving control corresponding to an automatic driving level equal to or less than level 2, the automated-driving ECU 10 may be referred to as a driving assistance ECU.

The automated-driving ECU 10 recognizes a traveling environment surround the vehicle 1 based on, for example, locator information and map data obtained from the locator 3, detection information obtained from the sensor 2, and information on other vehicles obtained from the V2X communication device 4. Next, the automated-driving ECU 10 generates a planned traveling path for the vehicle 1 based on the recognition result of the traveling environment. The automated-driving ECU 10 performs steering control and/or acceleration/deceleration control of the vehicle 1 according to the planned traveling path in cooperation with the travel control system 5. The automated-driving ECU 10 performs ACC control and/or LTA control, for example. ACC stands for Adaptive Cruise Control. LTA is an abbreviation for Lane Tracing Assist.

<Automated-Driving ECU>

Figure 2:
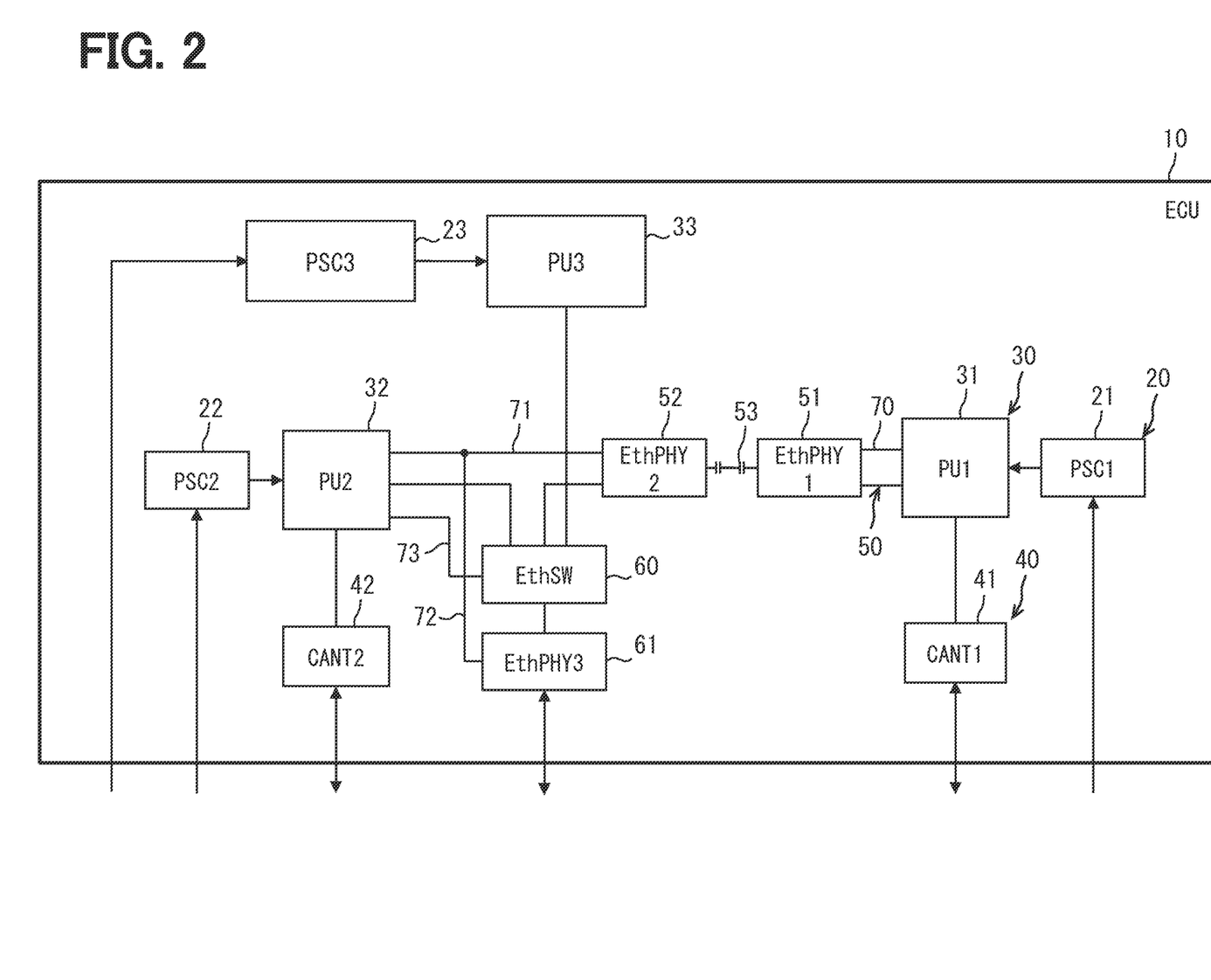
FIG. 2 is a circuit diagram showing a schematic configuration of the automated-driving ECU according to a first embodiment.

Next, based on FIG. 2, a schematic configuration of the automated-driving ECU 10 will be described. In FIG. 2, each of the communication lines is illustrated as a single line for convenience. For example, communication lines for parallel communication or at least one communication line for serial communication that is used as a pair are shown as one line. The communication lines may be referred to as signal lines.

The automated-driving ECU 10 includes a plurality of connectors (not shown). The connector may be referred to as an interface. The automated-driving ECU communicates with the sensor 2, the locator 3, the V2X communication device 4, the travel control system 5, and the like via connectors. The automated-driving ECU receives power from a plurality of power supply devices mounted in the vehicle 1 via connectors.

The automated-driving ECU 10 includes a plurality of power supply circuits that supply electric power for operating circuit elements in the automated-driving ECU 10. Each of the power supply circuits 20 generates a constant voltage lower than the supply voltage based on the voltage supplied from the power supply device and supplies the generated constant voltage to circuit elements. That is, the power supply circuit 20 is a constant voltage power supply. The power supply circuit 20 may be called an internal power supply circuit. One power supply circuit 20 may generate a single constant voltage, or may generate a plurality of constant voltages different from each other. The plurality of power supply circuits 20 include a power supply circuit (PSC1) 21, a power supply circuit (PSC2) 22, and a power supply circuit (PSC3) 23.

The power supply circuit 21 receives power from the first power supply device through the connector. The power supply may be an IG power supply input from the first power supply via a switch or a +B power supply input without a switch. Based on the power supply, the power supply circuit 21 generates a constant voltage lower than the power supply voltage, and supplies the generated constant voltage to the processing unit 31 and the like, which will be described later. A power supply line connecting the power supply circuit 21 and the connector is provided with, for example, a diode for protection against reverse connection. The power supply circuit 21 corresponds to a first power supply circuit.

The power supply circuit 22 receives power from a second power supply, which is different from the first power supply, via the connector. The power supply may be an IG power supply input from the second power supply via a switch, or a +B power supply input without a switch. Based on the power supply, the power supply circuit 22 generates a constant voltage lower than the power supply voltage, and supplies the generated constant voltage to the processing unit 32 and the like, which will be described later. A power supply line connecting the power supply circuit 22 and the connector is provided with, for example, a diode for protection against reverse connection. The power supply circuit 22 corresponds to a second power supply circuit.

The power supply circuit 23 receives power through the connector. The power may be input from the above-described first power supply device, or may be input from the second power supply device. Also, +B power supply or IG power supply may be used. Based on the power supply, the power supply circuit 23 generates a constant voltage lower than the power supply voltage, and supplies the generated constant voltage to the processing unit 33 and the like, which will be described later. A power supply line connecting the power supply circuit 23 and the connector is provided with, for example, a reverse connection protection circuit and a cutoff circuit. The cutoff circuit has a switch that turns on and off according to an operating state of the IG. The cutoff circuit electrically connects the power supply circuit 23 and the connector when the IG indicates an operating state. The cutoff circuit cuts off electric connection between the power supply circuit 23 and the connector when the IG indicates a stopped state. Note that the cutoff circuit may be provided outside of the automated-driving ECU 10.

The automated-driving ECU 10 includes a plurality of processing units 30 as circuit elements for executing arithmetic processing. The processing unit may be, for example, MCU or SoC. MCU is an abbreviation for Micro Controller Unit. MCU may be referred to as a microcomputer. SoC is an abbreviation for System on a Chip. The processing unit 30 has a processing unit (PU 1) 31 and a processing unit (PU 2) 32 that is provided redundantly with respect to the processing unit 31. The processing units 31 and 32 are redundantly provided corresponding to the redundantly provided travel control devices. The power supply circuits 21 and 22 are also redundantly provided corresponding to the processing units 31 and 32.

The processing units 31, 32, and 33 execute arithmetic processing in order to execute travel control corresponding to an automatic driving level equal to or more than level 1. The processing units 31, 32, and 33 each have a processor and a memory (not shown). The memory is a non-transitory tangible storage medium that non-temporarily stores computer-readable program and data. The memory stores various programs to be executed by the processor. The processor executes multiple instructions in the program stored in the memory. In addition, as other memory, a RAM (Random Access Memory) that can be read and written as a data area is provided. These memories may be provided inside or outside of the processing unit.

The processing unit 31 executes predetermined arithmetic processing based on the planned traveling path generated by the processing unit 33, and generates a first control signal for controlling the first travel control device. The processing unit 31 corresponds to the first processing unit. The processing unit 32 executes the same or similar processing as the processing unit 31 based on the planned travel path generated by the processing unit 33. The processing unit 32 generates a second control signal for a second travel control device redundantly provided with the first travel control device through arithmetic processing. The processing unit 32 corresponds to the second processing unit.

The processing unit 33 recognizes a traveling environment around the vehicle 1 based on locator information and map data obtained from the locator 3, detection information obtained from the sensor 2, and information on other vehicles obtained from the V2X communication device 4. The processing unit 33 generates a planned traveling path for the vehicle 1 based on the recognition result of the traveling environment. In this way, the processing unit 33 recognizes the traveling environment and generates the planned traveling path by executing predetermined arithmetic processing.

The processing units 31, 32, and 33 perform communication according to a predetermined communication protocol. As an example, the processing units 31 and 32 of this embodiment communicate with other nodes such as the sensor 2 and the travel control system 5 in compliance with the CAN protocol. CAN is a registered trademark and is an abbreviation for Controller Area Network. The processing unit 31 communicates with the processing unit 32 according to the Ethernet protocol. The processing units 31 and 32 communicate with the processing unit 33 according to the Ethernet protocol. Ethernet is a registered trademark.

The automated-driving ECU 10 includes a plurality of CAN transceivers 40, communication lines 50, an Ethernet switch (EthSW) 60, an Ethernet PHY device (EthPHY3) 61, etc. on a communication path for realizing the control as described above. The plurality of CAN transceivers 40 include a CAN transceiver (CANT1) 41 and a CAN transceiver (CANT2) 42. The CAN transceiver 42 is provided redundantly with respect to the CAN transceiver 41.

The CAN transceiver 41 is electrically connected to the processing unit 31 and electrically connected to the CAN bus of the communication buses 6 via the connector. The CAN transceiver 41 enables two-way communication between the communication bus 6 and the processing unit 31 by inter-converting electrical characteristics between the communication bus 6 and the processing unit 31. The CAN transceiver 42 is electrically connected to the processing unit 32 and electrically connected to the CAN bus of the communication buses 6 via the connector. The CAN transceiver 42 enables two-way communication between the communication bus 6 and the processing unit 32 by inter-converting electrical characteristics between the communication bus 6 and the processing unit 32.

The communication line 50 communicably connects the processing unit 31 and the processing unit 32. The communication line 50 has an Ethernet PHY device (EthPHY1) 51, an Ethernet PHY device (EthPHY2) 52 and a capacitor 53. Hereinafter, the Ethernet PHY devices 51, 52, 61 may be referred to as PHYs 51, 52, 61.

The PHYs 51, 52, and 61 are devices and hardware circuits for inter-converting analog signals and MAC digital signals for communication in compliance with the Ethernet standard. MAC is an abbreviation for Media Access Controller. Thus, PHYs 51, 52, 61 convert electrical signals. PHYs 51, 52 convert electrical signals that are communicable via AC coupling. PHYs 51 and 52 correspond to a pair of Ethernet physical layer devices. The PHYs 51, 52, 61 operate, for example, according to operation settings registered in a register (not shown).

The automated-driving ECU 10 includes communication lines 70, 71, and 72 for changing settings, etc., in addition to the communication line 50 as described above. The register settings of the PHYs 51, 52 and 61 are appropriately rewritten by the processing units 31 and 32. The processing units 31 and 32 serve as MACs. The processing unit 31 is communicably connected to the PHY 51 via the communication line 70. The processing unit 31 changes and monitors the operating state of the PHY 51 through the communication line 70. The processing unit 32 is communicably connected to the PHY 52 via the communication line 71. The processing unit 32 is communicably connected to the PHY 61 via the communication line 72. The processing unit 32 changes and monitors the operating state of the PHYs 52 and 61 through the communication lines 70 and 72.

The PHYs 51 and 52 are arranged side by side along the communication line 50. That is, the PHYs 51 and 52 are arranged in series between processing units 31 and 32. The PHY 51 is arranged on a side of the processing unit 31, and the PHY 52 is arranged on a side of the processing unit 32. For example, the PHY 51 converts the MAC digital signal transmitted from the processing unit 31 through the communication line 50 into an analog signal in compliance with the Ethernet standard, and outputs the converted analog signal to the PHY 52. The PHY 51 converts, into the MAC digital signal, the analog signal that is in compliance with the Ethernet standard and is output from the PHY 52, and outputs the converted MAC digital signal to the processing unit 31.

Communication between the processing unit 31 and the PHY 51 and communication between the processing unit 32 and the PHY 52 on the communication line 50 are in compliance with, for example, the MII standard or a variation of the MII standard. MII is an abbreviation for Media Independent Interface. MII has various variations depending on the speed and the number of signals.

The capacitor 53 is arranged between the pair of PHYs 51 and 52 on the communication line 50. The capacitor 53 has the processing unit 31 and the processing unit 32 AC-coupled and electrically isolates the processing unit 31 from the processing unit 32. The capacitor 53 is a coupling capacitor that blocks direct current signals and allows alternating current signals to pass through. One or more capacitors 53 are provided for each communication line between the PHYs 51 and 52. As one example, in this embodiment, two capacitors 53 are provided for a single communication line. The capacitance of the capacitor 53 is appropriately set so as to perform the functions as described above. For example, each capacitor 53 has the capacitance of about 0.1 µF to 1 µF.

The Ethernet switch 60 is provided in the middle of the communication line Specifically, the switch 60 is provided between the processing unit 32 and the PHY 52. The processing unit 32 and PHY 52 communicate with each other via the Ethernet switch 60 on the communication line 50. The Ethernet switch 60 is also communicably connected to the PHY 61. The Ethernet switch 60 can communicate with external devices such as the sensor 2 via the PHY 61. The Ethernet switch 60 is also communicably connected to the processing unit 33. As one example, in this embodiment, communication between the Ethernet switch 60 and the PHY 61 and communication between the Ethernet switch 60 and the processing unit 33 are in compliance with the MII standard or a variation of the MII standard.

The automated-driving ECU 10 has a communication line 73 for controlling the operating state of the Ethernet switch 60. The processing unit 32 controls the operating state of Ethernet switch 60, such as the connection state, via the communication line 73.

As described above, the processing unit 33 receives, via the connector, the locator information and the map data obtained from the locator 3, the detection information obtained from the sensor 2, and the information on other vehicles obtained from the V2X communication device 4.

The processing unit 33 receives detection signals from the millimeter-wave radar and LiDAR as the sensor 2, image data from the camera, locator information, map data, information on other vehicles, and the like via the connector. The processing unit 33 receives part of the information via the connector, the CAN transceiver 41, the processing unit 31, the communication line 50, and the Ethernet switch 60. The processing unit 33 receives other parts of the information via the connector, the CAN transceiver 42, the processing unit 32, the communication line 50, and the Ethernet switch 60. The processing unit 33 receives other parts of the information via the connector, the PHY 61, and the Ethernet switch 60. Information to be used by the processing unit 33, such as image data of the camera, may be obtained from a route other than the above-described routes.

In this way, the processing unit 33 receives part of the information via the processing units 31 and 32. The processing unit 33 receives other parts of the information without going through the processing units 31 and 32. The processing unit 33 transmits data of the generated planned traveling path to each of the processing units 31 and 32.

On the other hand, the processing unit 31 receives data of the planned traveling path from the processing unit 33 via the Ethernet switch 60 and the communication line 50. The processing unit 31 transmits a first control signal via the CAN transceiver 41 and the connector. The processing unit 31 transmits the first control signal via the connector and the communication bus 6 to the travel control system 5 that controls the first travel control device. The travel control system 5 controls the first travel control device based on the first control signal. In this way, the processing unit 31 executes steering control and/or acceleration/deceleration control of the vehicle 1.

Similarly, the processing unit 32 receives data of the planned traveling path from the processing unit 33 via the Ethernet switch 60 and the communication line 50. The processing unit 32 transmits a second control signal via the CAN transceiver 42 and the connector. The processing unit 32 transmits the second control signal via the connector and the communication bus 6 to the travel control system 5 that controls the second travel control device. The travel control system 5 controls the second travel control device based on the second control signal. Further, each of the processing units 31 and 32 has a self-diagnostic function. When the processing unit 31 detects an abnormality that would interfere with control, the processing unit 31 transmits a signal indicating that an abnormality occurred to the processing unit 32 via the communication line 50. Thereby, the processing unit 32 executes a fallback control, for example. Similarly, when the processing unit 32 detects an abnormality that would interfere with control, the processing unit 32 transmits a signal indicating that an abnormality occurred to the processing unit 31 via the communication line 50. Thereby, the processing unit 31 executes a fallback control, for example.

Summary of the First Embodiment

Figure 3:
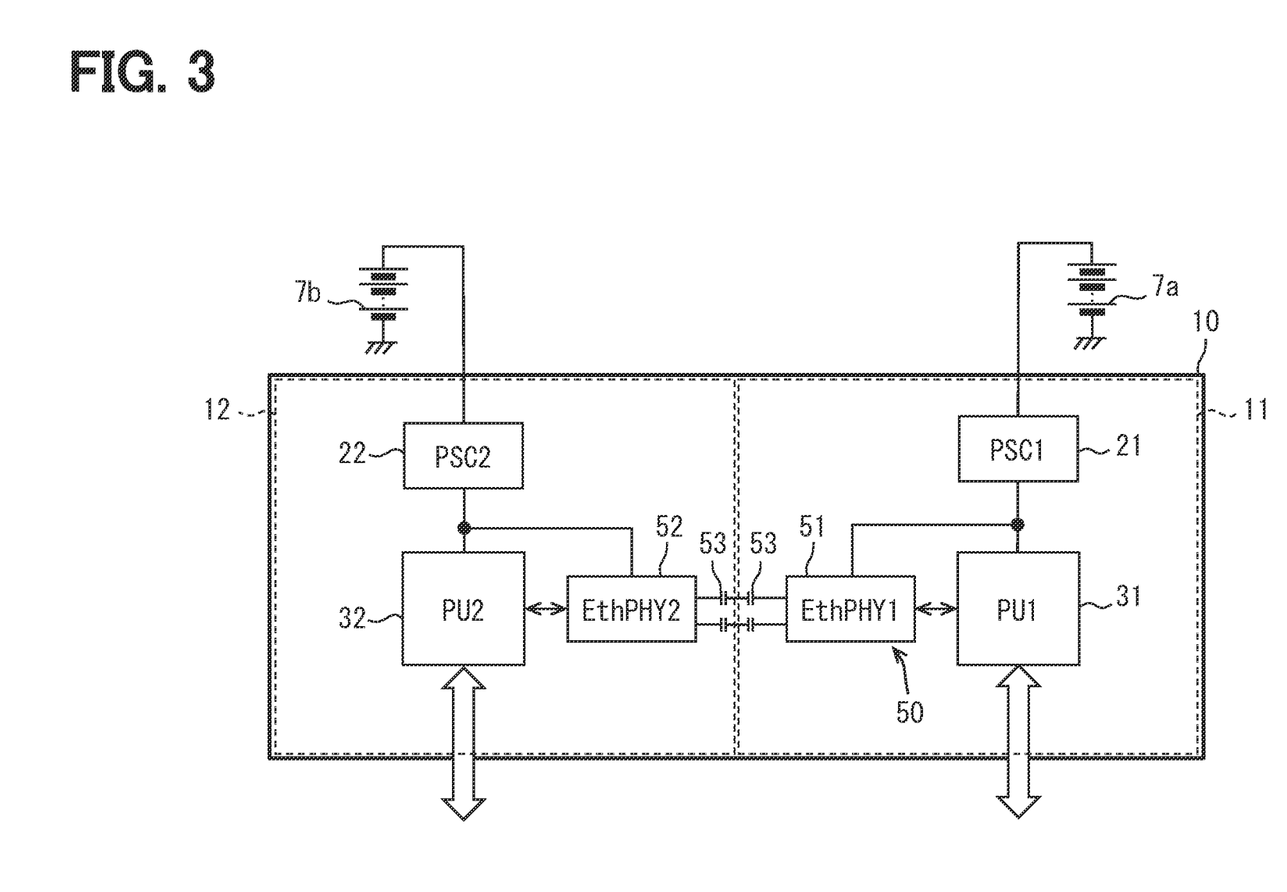
FIG. 3 is a diagram showing a redundant configuration in the automated-driving ECU.

FIG. 3 shows a main portion of the redundant structure of the automated-driving ECU 10 shown in FIG. 2. In FIG. 3, the communication line 50 between the PHY 51 and the PHY 52 is indicated by a pair of paired lines.

As shown in FIG. 3, the automated-driving ECU 10 has the circuit system 11 and the circuit system 12. The circuit system 12 is redundantly provided with respect to the circuit system 11. Components of the circuit system 11 may be labeled with "first". Components of the circuit system 12 may be labeled with "second".

The vehicle 1 includes the power supply devices 7a and 7b. The power supply device 7a corresponds to the first power supply device, and the power supply device 7b corresponds to the second power supply device. The power supply device 7a supplies power to the circuit system 11. The power supply device 7b supplies power to the circuit system 12. The power supply may be +B power supply or may be IG power supply as described above.

The circuit system 11 includes the power supply circuit 21, the processing unit 31, and a part of the communication line 50. The circuit system 11 includes, as the communication line 50, the PHY 51 and one of two capacitors 53 provided for each of the communication lines. The power supply circuit 21 generates and supplies power for operating other elements of the circuit system 11 based on the power supplied from the power supply device 7a. The power supply circuit 21 supplies power not only to the processing unit 31 but also to the PHY 51 and the like.

The circuit system 12 includes the power supply circuit 22, the processing unit 32, and a part of the communication line 50. The circuit system 12 includes, as the communication line 50, the PHY 52 and the other one of the two capacitors 53. The power supply circuit 22 generates and supplies power for operating other elements of the circuit system 12 based on the power supplied from the power supply device 7b. The power supply circuit 22 supplies power not only to the processing unit 32 but also to the PHY 52 and the like.

Thus, in this embodiment, a pair of the PHYs 51 and 52 and the capacitors 53 are provided on the communication line 50 between the processing units 31 and 32. The capacitor 53 has the processing unit 31 and the processing unit 32 AC-coupled and electrically isolates the processing unit 31 from the processing unit 32. The PHYs 51 and 52 convert input signals from the corresponding processors 31 and 32 so that the capacitors 53 can communicate using AC coupling. Therefore, even if short-circuit occurs in the power supply circuit 21 and an overvoltage exceeding a maximum voltage is applied to the processing unit 31, it is possible to avoid a situation where the overcurrent and overvoltage are applied to the processing unit 32 via the communication line 50. This is true if short-circuit occurs in the power supply circuit 22. As a result, while enabling communication via the communication line 50, occurrence of consecutive failures of the plurality of processing units 31 and 32 via the communication line 50 can be avoided. Thereby, even if one of the processing units 31 and 32 fails, the other one can execute control, such as, fallback control, and transmit a control signal to the travel control system 5.

In this embodiment, the Ethernet PHY devices 51 and 52 are used as a physical layer for converting electric signals for the AC coupling of the capacitor 53. Accordingly, since it is not necessary to design a new physical layer, the design can be simplified.

Second Embodiment

This embodiment is a modification based on the preceding embodiment, and the description of the preceding embodiment can be incorporated.

Figure 4:
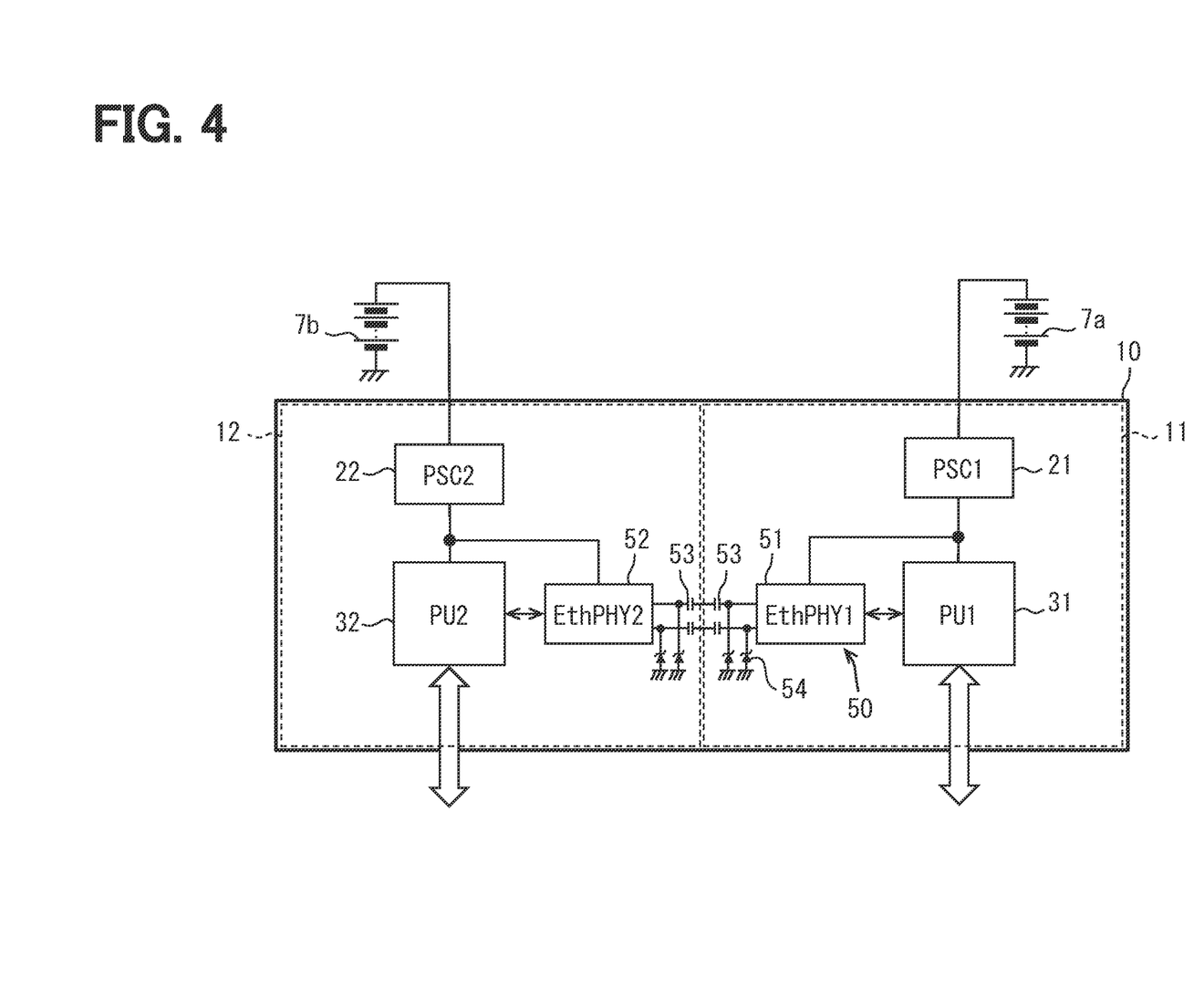
FIG. 4 is a diagram showing a redundant configuration of the automated-driving ECU according to a second embodiment.

FIG. 4 shows a main portion of the redundant structure of the automated-driving ECU 10 according to the present embodiment. FIG. 4 corresponds to FIG. 3 of the preceding embodiment. As shown in FIG. 4, the communication line 50 has diodes 54 for protection. The diodes 54 are provided between the PHYs 51 and 52. The diodes 54 absorb transient voltage. The diodes 54 correspond to a protective diode.

In this embodiment, two diodes 54 are connected to each communication line between the PHYs 51 and 52. The diode 54 is connected between the PHY 51 and the capacitor 53 on a side of the processing unit 31 among the two capacitors 53 disposed on a single communication line. The other diode 54 is connected between the capacitor 53 on a side of the processor 32 and the PHY 52. Each diode 54 is a Zener diode. Each diode 54 has a cathode connected to the communication line and an anode that is grounded (GND). Thereby, an overvoltage suppression effect can be obtained.

Summary of the Second Embodiment

According to the configuration as described above, the diodes 54 can suppress a sharp change in voltage. As a result, occurrence of consecutive failures of the plurality of processing units 31 and 32 via the communication line 50 can be avoided more effectively.

Although each diode 54 in the present embodiment is formed of one Zener diode, the present disclosure is not necessarily limited to this. For example, one diode 54 may be formed of two Zener diodes. The two Zener diodes have their cathodes connected to each other. One of the anodes is grounded (GND), and the other one of the anodes is connected to the communication line.

In the embodiment, the diode 54 is provided separately from the PHYs 51 and 52, the present disclosure is not necessarily limited to this. At least one of the PHYs 51 and 52 may have a diode 54. That is, the diode 54 may be integrally formed with at least one of the PHYs 51 and 52.

Other Embodiments

The disclosure in this specification, the drawings, and the like is not limited to the exemplified embodiments. The present disclosure includes embodiments described above and modifications of the above-described embodiments made by a person skilled in the art. For example, the disclosure is not limited to the combinations of components and/or elements shown in the embodiments. The disclosure may be implemented in various combinations. The disclosure may have additional members which may be added to the embodiments. The present disclosure encompasses the embodiments where some components and/or elements are omitted. The present disclosure encompasses replacement or combination of components and/or elements between one embodiment and another. The disclosed technical scope is not limited to the descriptions of the embodiments. The several technical scopes disclosed are indicated by the description of the claims, and should be further understood to include meanings equivalent to the description of the claims and all modifications within the scope.

The disclosure in the specification, drawings and the like is not limited by the description of the claims. The disclosure in the specification, the drawings, and the like includes the technical idea described in the claims, and further covers a wider variety of technical ideas than the technical idea described in the claims. Hence, various technical ideas can be extracted from the disclosure of the specification, the drawings, and the like without being bound by the description of the claims.

In the above-described embodiments, the automated-driving ECU 10 includes the processing units 31, 32, and 33, but the automated-driving ECU 10 is not necessarily limited to this configuration. For example, instead of using three processing units 31, 32, and 33, two processing units may be used. In this case, one of the processing units corresponds to the first processing unit, and the other one of the processing units corresponds to the second processing unit.

In other words, the automated-driving ECU 10 may include a first processing unit and a second processing unit that is provided redundantly with respect to the first processing unit. For the first processing unit and the second processing unit, it is possible to use any configuration that includes a processor and a memory and is configured to execute predetermined arithmetic processing. That is, the first and second processing units are not necessarily limited to MCU or SoC.

Although the processing unit 33 generates the planned traveling path, the present disclosure is not necessarily limited to this. At least one of the first processing unit and the second processing unit may have the function of generating the planned traveling path. For example, the first processing unit may generate the planned traveling path and transmit the generated planned traveling path to the second processing unit via the communication line 50. As a result, the second processing unit can also generate a control signal for the vehicle based on the planned traveling path. Alternatively, each of the first processing unit and the second processing unit may have the function of generating the planned traveling path.

The protocol for communication between the automated-driving ECU 10 and other nodes is not necessarily limited to the above example. For example, FlexRay, LIN, etc. may be used. FlexRay is a registered trademark. LIN is an abbreviation for Local Interconnect Network. The communication standard in the automated-driving ECU 10 is also not necessarily limited to the above example.

Figure 5:
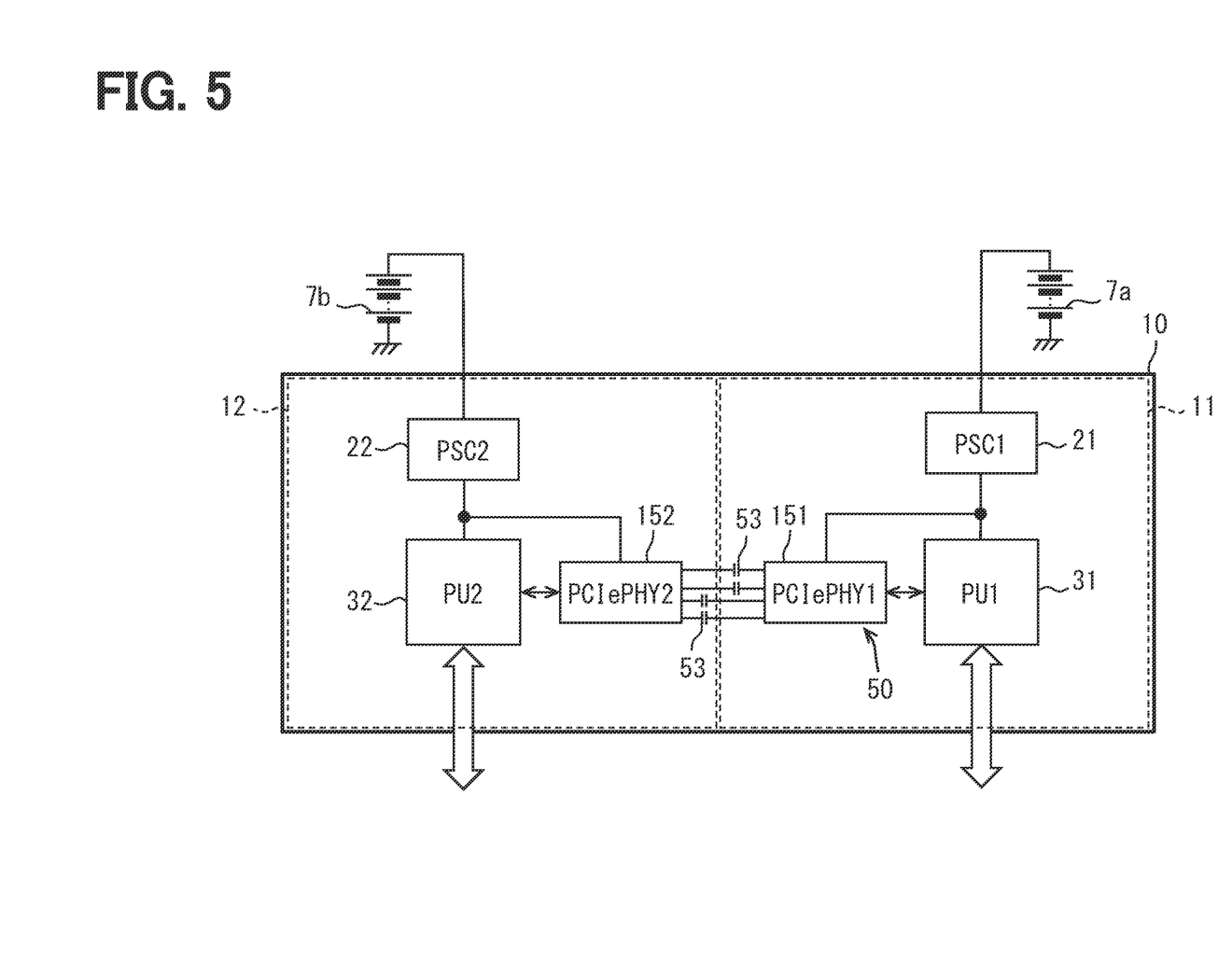
FIG. 5 is a diagram a modified example.

Although the Ethernet PHY devices 51 and 52 are shown as examples of physical layer devices, they are not necessarily limited to this. For example, as shown in FIG. 5, the communication line 50 may have PCIexpressPHY devices (PCIePHY) 151 and 152 as a pair of physical layer devices. The PCIexpressPHY devices 151 and 152 are hereinafter referred to as PHYs 151 and 152. Communication between the PHYs 151 and 152 has two pairs of communication (positive and negative) for transmission and reception, respectively. In this case, communication between the PHYs 151 and 152 is in compliance with the PCI Express standard.

Figure 6:
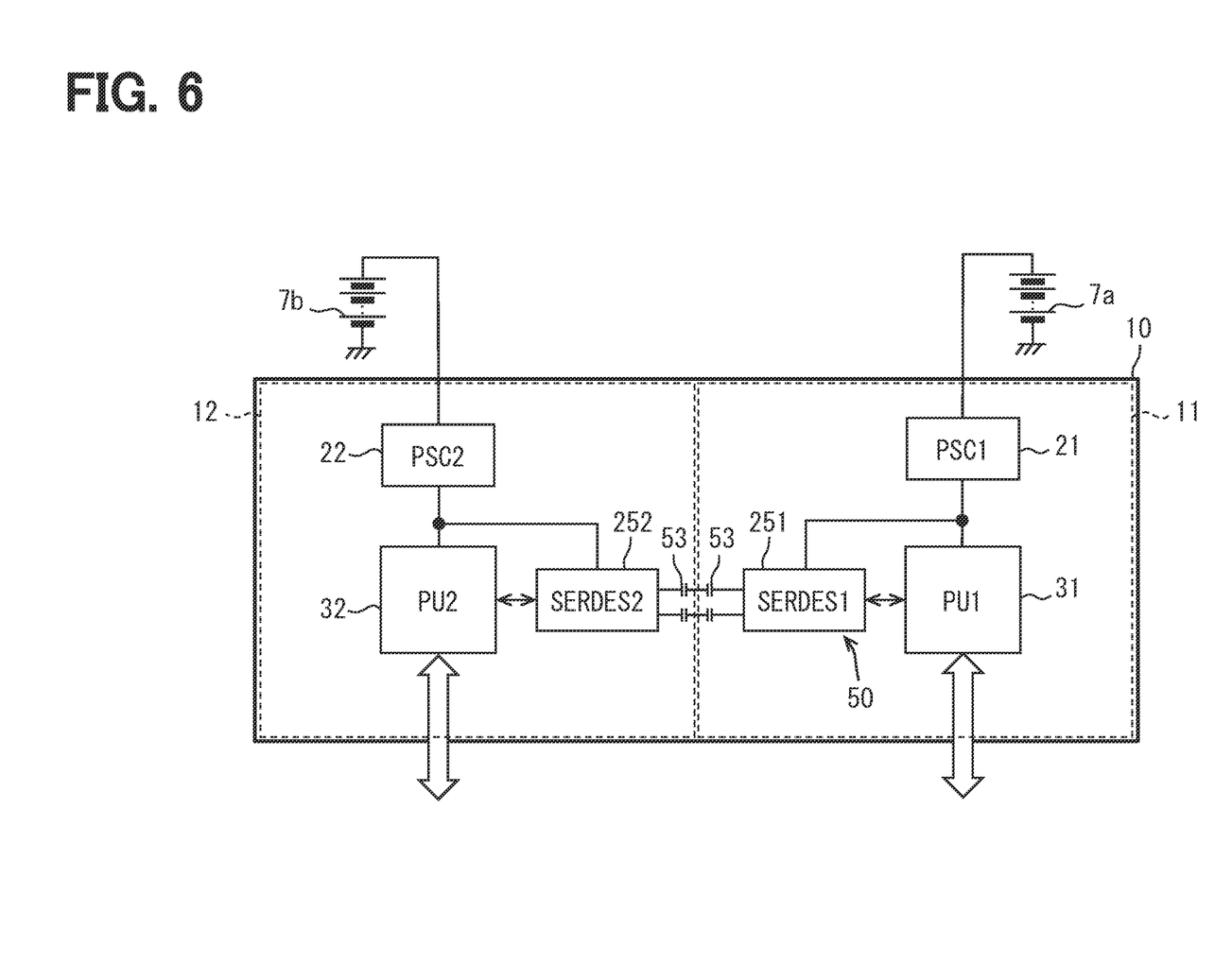
FIG. 6 is a diagram showing a modified example.

Furthermore, as shown in FIG. 6, the communication line 50 may have serializer/deserializers (SERDES) 251 and 252 as a pair of physical layer devices. The serializers/deserializers 251 and 252 are hereinafter referred to as PHYs 251 and 252. A serializer serializes signals on a parallel bus, while a deserializer parallelizes signals on a serial bus. Each of the PHYs 251 and 252 has functions of serializer and deserializer. That is, bidirectional conversion can be made. In this case, communication between the serializer/deserializer 251 and 252 is in compliance with various standards of LVDS SerDes. If the communication direction is one way, a serializer may be used as one of a pair of physical layer devices, and a deserializer may be used as the other of that pair. In other words, one device of the pair of physical layer devices may have at least the serializer function, and the other device may have at least the deserializer function.

Although not illustrated, the PCIexpressPHY devices 151 and 152 and the serializer/deserializer 251 and 252 include circuits necessary for operation as with the Ethernet PHY devices 51 and 52. In other words, anything that can be used as a physical layer for high-speed transmission can be applied to this technology.

In this way, various high-speed serial communication transmission standards can be applied, and physical layer devices corresponding to those standards can be used. For example, if the PHYs 151, 152, 251, and 252 are used, it is not necessary to design a new physical layer. Thus, design can be simplified. Note that the configuration described in the second embodiment may be combined with the configurations shown in FIGS. 5 and 6. FIG. 5 and FIG. 6 correspond to FIG. 3.

Although an example of the automated-driving ECU 10 is shown as an electronic control device, it is not necessarily limited to this. The present disclosure can be applied to an electronic control unit that controls a vehicle.

In the above-described embodiments, the automated-driving ECU 10 recognizes a traveling environment of the vehicle 1 based on locator information and map data obtained from the locator 3, detection information obtained from the sensor 2, and information on other vehicles obtained from the V2X communication device 4. Then, the automated-driving ECU 10 generates the planned traveling path. However, the present disclosure is not necessarily limited to the above. For example, without using information of the V2X communication device 4, based on the locator information and the map data obtained from the locator 3 and the detection information obtained from the sensor 2, the traveling environment of the vehicle 1 may be recognized, and the planned traveling path may be determined. The present disclosure can also be applied to a vehicle 1 that does not have a function of inter-vehicle communication or road-to-vehicle communication. The present disclosure can also be applied to a vehicle 1 without the V2X communication device 4.

The invention claimed is:

1. An electronic control unit mounted in a vehicle, comprising:
a first processing unit that is configured to execute predetermined arithmetic processing and generate a first control signal for controlling the vehicle;
a second processing unit that is redundantly disposed with the first processing unit and is configured to generate a second control signal for controlling the vehicle;
a first power supply circuit that is configured to generate power for operating the first processing unit based on power supplied from a first power supply device mounted in the vehicle;
a second power supply circuit that is configured to generate power for operating the second processing unit based on power supplied from a second power supply device mounted in the vehicle; and
a communication line that communicably connects the first processing unit and the second processing unit to each other, wherein
the communication line includes (i) a pair of physical layer devices that are configured to convert an electrical signal and (ii) a capacitor that is disposed between the pair of physical layer devices on the communication line and is configured to electrically isolate the first processing unit and the second processing unit from each other by AC coupling, and
the pair of physical layer devices are configured to convert the electrical signal to perform communication using the AC coupling.

2. The electronic control unit according to claim 1, wherein
each of the pair of physical layer devices is an Ethernet physical layer device.

3. The electronic control unit according to claim 1, wherein
each of the pair of physical layer devices is a PCI express physical layer device.

4. The electronic control unit according to claim 1, wherein
one of the pair of physical layer devices has at least a serializer function and the other of the pair of physical layer devices has at least a deserializer function.

5. The electronic control unit according to claim 1, wherein
the communication line includes a protective diode that is disposed between the pair of physical layer devices or is integrally formed with at least one of the pair of physical layer devices to absorb transient voltage.

6. The electronic control unit according to claim 1, wherein
the electric signal is information for the vehicle to perform automated-driving.

* * * * *